United States Patent [19]

DeMaria

[11] 4,352,852
[45] Oct. 5, 1982

[54] REINFORCED PLASTIC MATRIX OF THERMOSETTING RESIN EMBEDDED WITH ACRYLONITRILE POLYMER FIBER

[75] Inventor: Francesco DeMaria, Gulf Breeze; Relmond H. Hamilton, Pensacola, both of Fla.

[73] Assignees: American Cyanamid Company, Stamford, Conn.; Relmond H. Hamilton, Pensacola, both of Fla.

[21] Appl. No.: 151,021

[22] Filed: May 19, 1980

[51] Int. Cl.³ .................... B32B 27/00; D04B 1/00; D01F 6/18
[52] U.S. Cl. .................... 428/290; 428/253; 428/245; 428/375; 428/500; 428/483; 428/394; 264/206; 264/328.18; 525/425
[58] Field of Search ............... 525/425; 428/375, 290, 428/378, 483, 394; 264/206, 328.18

[56] References Cited

U.S. PATENT DOCUMENTS

| | | | |
|---|---|---|---|
| 3,490,686 | 10/1969 | Fleming et al. | 525/425 |
| 3,910,026 | 10/1975 | Sone et al. | 428/378 |
| 3,984,515 | 10/1976 | Mommaerts et al. | 428/394 |
| 4,119,607 | 10/1978 | Gergen et al. | 525/425 |
| 4,259,457 | 3/1981 | Login | 428/375 |

*Primary Examiner*—P. Ives
*Attorney, Agent, or Firm*—Frank M. Van Riet

[57] ABSTRACT

Use of a high tenacity acrylonitrile polymer fiber in a reinforced plastic composition based on a thermosetting resin produces high tensile impact at low fiber usage.

4 Claims, No Drawings

REINFORCED PLASTIC MATRIX OF THERMOSETTING RESIN EMBEDDED WITH ACRYLONITRILE POLYMER FIBER

This invention relates to a thermoset fiber-reinforced plastic composition. More particularly, this invention relates to such a composition wherein the fiber reinforcement is a high-tenacity melt-spun acrylonitrile polymer fiber.

Reinforced plastics are compositions in which a plastic matrix is combined with a reinforcing agent to improve one or more properties of the plastic matrix. The plastic matrix is also called a resin which may be thermoplastic or thermosetting although the present invention involves only thermosetting resins. Thermosetting resins are formed when a liquid resin is activated with a suitable catalyst which generally converts a liquid resin to solid form through the mechanism of crosslinking, chain extension, chain branching, bonding and the like, as well as a combination of such reactions. Catalysts and heat are generally employed to activate and accelerate the reactions although activation may be by other means.

In producing fiber-reinforced plastic compositions using thermoplastic resins as the plastic matrix, the extent to which reinforcement occurs will generally depend upon the nature of the reinforcing fiber employed and the extent to which bonding of such fiber by the plastic matrix occurs. Glass fiber is currently one of the strongest reinforcements available and when properly employed can furnish high strength and good thermal stability. Glass fiber, however, has several deficiencies which require special attention in order to obtain proper utility thereof. Glass fiber has poor abraison resistance and requires special care in the preparation of reinforced plastics. In addition, glass fiber has poor bonding properties with most thermosetting resins and requires special pre-treatment to promote bonding. Frequently, the glass fibers are not properly wetted by the thermosetting resin used as the plastic matrix with the result that bonding is poor and air may become entrapped within the plastic composition. The resulting composition has poor strength properties and is objectionable because of the entrapped air.

Because of the poor bonding properties of glass fiber without special pretreatment and because of the careful handling required due to its poor abrasion resistance a substitute reinforcing fiber which is free of these deficiencies and provides equally good reinforcement has long been desired. The provision for such a reinforcing fiber would satisfy this long-felt need and constitute a significant advance in the art.

In accordance with the present invention, there is provided a reinforced plastic composition comprising a plastic matrix derived from a thermosetting resin and embedded therein an effective amount of an acrylonitrile polymer fiber having a straight tenacity of at least about 5 grams per denier.

A reinforced plastic composition prepared in accordance with the present invention surprisingly exhibits strength values equivalent to those obtained with glass fiber at lower usage of reinforcing fiber. The fiber reinforced plastic composition of the present invention contains as its reinforcement an acrylonitrile polymer fiber that has higher tenacity than conventional acrylonitrile polymer fibers. This reinforcing fiber also has improved abrasion resistance over glass fiber, does not require special additives to promote fiber-resin bonding, and is wet by the thermosetting resins more readily than is glass fiber.

In preparing the reinforced plastic composition of the present invention, a thermosetting resin is employed as the plastic matrix-forming material. Suitable thermosetting resins are well known in the art and are illustrated by diallyl phthalate polymers, epoxy resins, melamine-formaldehyde condensates, phenolics, unsaturated polyesters, silicones, as well as combinations of these and other types. Conventional agents employed with the thermosetting resin to effect reaction thereof are also well known and are employed in conventional manner. The present invention requires no new teachings with respect to the thermosetting resin used as the plastic matrix-forming material and involves only a new reinforcing fiber for use therewith.

In the plastic substrate described above there is embedded in accordance with the present invention an acrylonitrile polymer fiber having a tenacity of at least about 5 grams per denier and preferably higher. This acrylonitrile polymer fiber has a significantly higher tenacity than conventional commercial acrylonitrile polymer fiber and may be obtained by several procedures. One procedure for preparing the high tenacity acrylonitrile polymer fiber used in the reinforced plastic of the present invention is to subject a conventional wet or dry spun acrylonitrile polymer fiber to additional stretching beyond that employed in fiber-making. Such stretching can be in steam under pressure at sufficient stretch ratio to provide the desired level of tenacity. Stretching in accordance with fiber-making is normally below a total stretch ratio of 20 and at such values of stretch ratio the tenacity is generally less than about 3.5 grams per denier. By increasing the total stretch ratio to at least about 25 to more in steam under pressure, stretching can readily be accomplished and tenacity values in excess of about 5.0 grams per denier will result. Acrylonitrile polymer fiber so processed is useful as reinforcement in the reinforced plastic of the present invention.

Another procedure for preparing the high tenacity acrylonitrile polymer fiber for use in accordance with the present invention, and the preferred method, is to spin a homogeneous single phase fusion melt of acrylonitrile polymer and water through a spinneret assembly directly into a steam-pressurized solidification zone which controls the rate of release of water from the nascent extrudate and stretching the extrudate while it remains with the solidification zone at a stretch ratio that provides the desired tenacity. Such stretching may be accomplished in one or more stretch stages and the desired tenacity will generally be obtained when the total stretch ratio employed is at least about 25 or more, usually conducted in two stretch stages with the second stretch stage conducted at a stretch ratio greater than that employed in the first stretch stage.

The acrylonitrile polymer fiber employed in the reinforced plastic of the present invention may be used in filament form, in the form of yarn, in the form of knitted or woven fabric, or in the form of staple yarn, the latter form being preferred. It is generally not necessary to pretreat the fiber to improve its bonding properties and the fiber will readily become wet with the thermosetting resin. Lay-up of the fiber in preparing the reinforced plastic will follow conventional procedures. Use of the reinforcing fiber will typically be in the range of about 10 to 90 weight percent based on the total weight of the reinforced plastic composition although other amounts are sometimes used. The acrylonitrile polymer fiber may be used in a wide range of filamentary denier although low deniers are generally preferred because of the greater reinforcement they provide. The melt spinning procedure for making the acrylonitrile polymer fiber as described above is capable of providing finer deniers than are normally obtained by dry and wet spinning procedures and, accordingly, is a preferred method for preparing the acrylonitrile polymer fiber.

The invention is more fully illustrated in the examples which follow wherein all parts and percentages are by weight unless otherwise specified. In preparing the reinforced plastics described in the examples, the following general procedure was employed.

GENERAL PROCEDURE

Cast plastic sheets were prepared using a mold consisting of ⅛ inch thick aluminum plates. The base portion consisted of a 8 inch square having sides affixed thereto to provide a ⅛ inch thick casting. A separate cover portion to fit the base completed the mold. The mold cavity and cover were treated with mold release agent prior to each use.

To prepare castings an unsaturated polyester casting resin, such as that sold under the tradename USS Chem. MP-11048, was employed as the plastic matrix. Benzoyl peroxide, at a 2% level based on the weight of resin was used as catalyst. Catalyzed resin alone or catalyzed resin plus reinforcement was then placed in the mold in amounts necessary to fill the mold. Resin and reinforcement were placed in the mold in alternating layers, with resin forming the bottom and top layers.

After the mold was filled, the cover was positioned and the mold was then placed in a hydraulic press under pressure just sufficient to keep the mold securely closed. The mold contents were then allowed to set at ambient conditions for ½ hour. After this time the mold was removed from the press and cured at 200° F. for 2 hours. The mold was then removed from the oven, the molding recovered therefrom, and test samples cut for physical property measurements. Tests were performed by standard ASTM procedure for tensile impact. Results reported are the average values for five replicate tests.

COMPARATIVE EXAMPLE A

In this run, the polyester resin was used alone, i.e., without any reinforcement, in order to indicate the tensile impact of the non-reinforced resin, which is shown in Table I.

COMPARATIVE EXAMPLE B

In this run, the reinforcement was a knitted jersey of a Creslan ® Type 61, wet-spun acrylonitrile polymer fiber of 1.5 denier per filament and the following physical properties:

| Straight tenacity | 2.2 grams/denier |
|---|---|
| Straight elongation | 30% |

The molding consisted of 26 parts of jersey and 74 parts of resin. Tensile impact is also shown in Table I.
®Registered Trade Mark

COMPARATIVE EXAMPLE C

In this run, a glass cloth in the form of a 4 inch wide knitted tape was used. The glass fiber had a diameter of between 11 and 12 microns. Physical properties of the fiber were as follows:

| Straight tenacity | 10 grams/denier |
|---|---|
| Straight elongation | 5% |

The molding consisted of 24 parts of tape and 76 parts of resin. Tensile impact is given in Table I.

COMPARATIVE EXAMPLE D

In this run, glass roving was used as reinforcement. The glass fiber was of the same diameter and had the same physical properties as that from which the tape of Comparative Example C was constructed. The roving, which is a tow bundle of fibers was cut into 8 inch lengths and laid in the mold in parallel array. The molding consisted of 17 parts of glass roving and 83 parts of resin. Tensile impact is given in Table 1.

EXAMPLE 1

In this run, the reinforcement was a parallel array of acrylonitrile polymer fibers 8 inches long and 5 denier per filament. These fibers are prepared by extruding a homogeneous single phase fusion melt of acrylonitrile polymer and water through a spinneret assembly directly into a solidification zone maintained at 12 pounds per square inch gauge pressure with saturated steam. The extrudate was stretched in two stages of stretch while within the solidification zone, a first stage at a stretch ratio of 2.5 and a second stage at a stretch ratio of 10 for a total stretch ratio of 25. The acrylonitrile polymer was composed of 11 weight percent methyl methacrylate and 89 weight percent acrylonitrile and had a kinematic molecular weight value of 58,000 determined in accordance with conventional procedures. The fiber exiting from the solidification zone was collected and dried in air. The fiber had the following physical properties:

| Straight tenacity | 5.0 grams/denier |
|---|---|
| Straight elongation | 20% |

The molding consisted of 17 parts of fiber and 83 parts of resin. Tensile impact is shown in Table I which follows:

TABLE I

Tensile Impact of Cast Moldings

| Molding of Example No. | Reinforcement | Molding Thickness[1] | Resin Parts | Reinforcement Parts | Tensile Impact[2] |
|---|---|---|---|---|---|
| A | None | 0.140 | 100 | — | 9.2 ± 1 |
| B | Creslan ® Knit | 0.150 | 74 | 26 | 13.2 ± 1 |
| C | Glass Tape | 0.125 | 74 | 26 | 59.2 ± 2.5 |
| D | Glass Roving | 0.115 | 83 | 17 | 26.4 ± 8.0 |
| 1 | Acrylonitrile Poly- | | | | |

TABLE I-continued

| | | Tensile Impact of Cast Moldings | | | |
|---|---|---|---|---|---|
| Molding of Example No. | Reinforcement | Molding Thickness[1] | Resin Parts | Reinforcement Parts | Tensile Impact[2] |
| | mer Fiber Roving | 0.115 | 83 | 17 | 55.1 ± 2.1 |

NOTES:
[1] inches,
[2] Kilojoules per square meter

The results show that reinforced plastic compositions in general have superior tensile impact over the same non-reinforced plastic. The results also show that a glass cloth (Example C) exhibits superior reinforcement over a conventional wet-spun acrylonitrile polymer fiber (Example B). The results further show that a woven glass cloth (Example C) exhibits superior reinforcement over glass rovings (Example D).

Unexpectedly, the results show that a melt-spun acrylonitrile polymer fiber of high tenacity in the form of a roving (Example 1) shows superior reinforcement over glass roving (Example D) and comparable reinforcement to glass cloth (Example C) in spite of the fact that the melt-spun acrylonitrile polymer fiber was used in much lower amount than that of the glass cloth.

EXAMPLE 2

In this run, a post-stretched wet-spun acrylonitrile polymer fiber was employed as reinforcement. The fiber was prepared from the same polymer used to prepare the fiber of Example 1. The fiber was subjected to a total stretch ratio of 12 in conjunction with fiber making and had an initial straight tenacity of 1.4 grams/denier, straight elongation of 30%, and was of 3 denier per filament. This fiber was then subjected to post-stretching in saturated steam at a 135° C. to obtain a stretch ratio of 84X. The resulting stretched fiber was of 0.42 denier per filament and had a straight tenacity of 7.8 grams/denier and a straight elongation of 38%. The casting made using 17 parts of roving of this fiber and 83 parts of resin had substantially the same properties as that of Example 1.

We claim:

1. A reinforced plastic composition comprising a plastic matrix derived from a thermosetting resin and embedded therein from about 10 to 90 weight percent of an acrylonitrile polymer fiber having a straight tenacity of at least about 5.0 grams per denier, said percent being based on the weight of the reinforced plastic composition.

2. The reinforced plastic of claim 1 wherein said plastic matrix is derived from an unsaturated polyester resin.

3. The reinforced plastic composition of claim 1 wherein said acrylonitrile polymer fiber is obtained by extruding a homogeneous single phase fusion melt of acrylonitrile polymer and water through a spinneret assembly directly into a steam-pressurized solidification zone maintained under conditions which control the rate of release of water from the nascent extrudate and stretching the nascent extrudate while is remains within the solidification zone to provide the specified tenacity.

4. The reinforced plastic of claim 1 wherein said acrylonitrile polymer fiber is obtained by post-stretching a conventional wet spun fiber in stream under pressure to provide the specified tenacity.

* * * * *